Patented Mar. 4, 1947

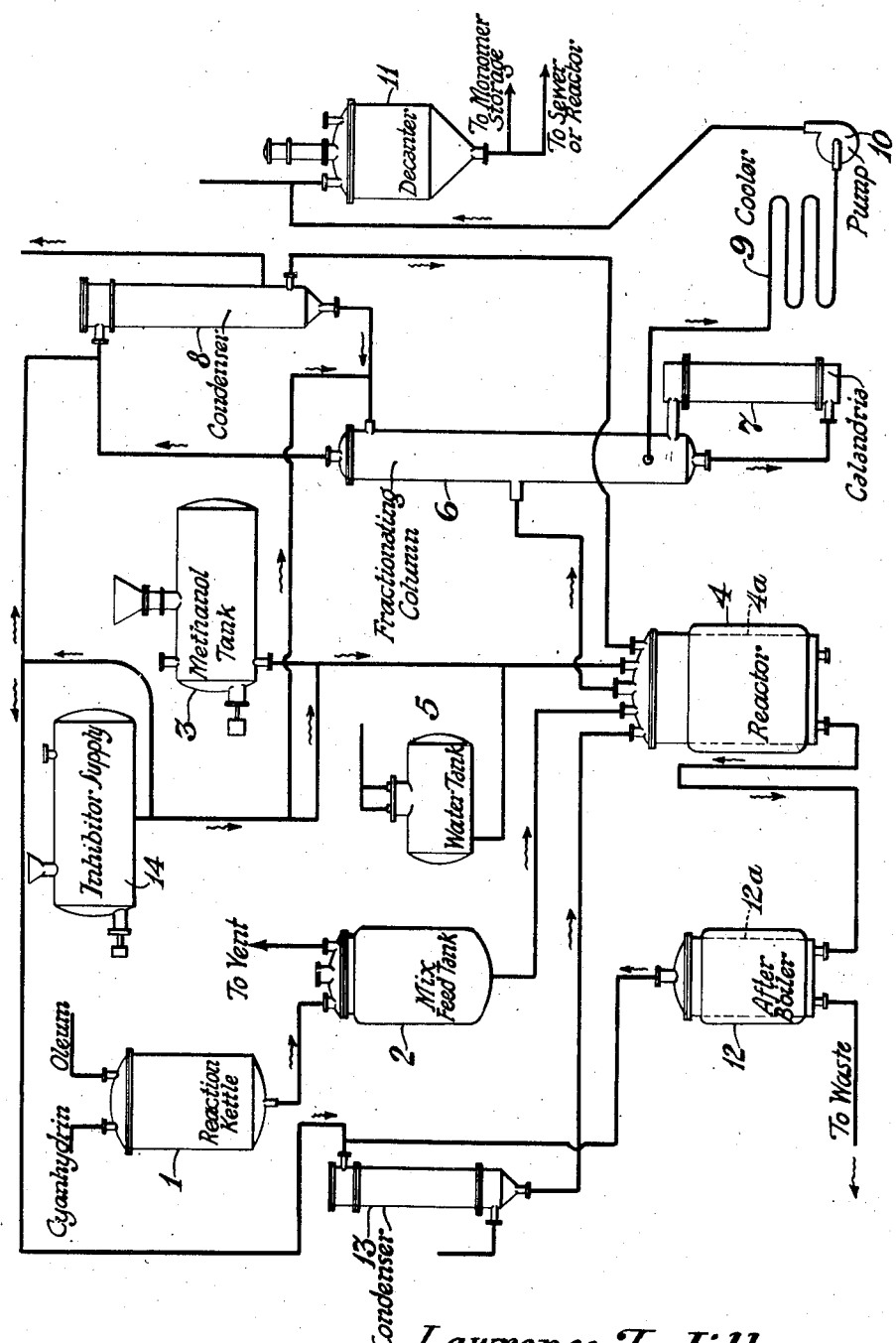

2,416,756

UNITED STATES PATENT OFFICE 2,416,756

CONTINUOUS PRODUCTION OF ESTERS OF METHACRYLIC ACID

Lawrence T. Jilk, Charleston, W. Va., assignor to E. I. du Pont de Nemours & Company, Wilmington, Del., a corporation of Delaware Application October 23, 1941, Serial No. 416,186

8 Claims. (Cl. 260—486)

The present invention relates to improvements in the preparation of esters of unsaturated acids and more particularly to the preparation of esters of alpha-substituted acrylic acids prepared by the interaction of acetone cyanhydrin with alcohols.

In the industrial production of unsaturated esters as, for example, by the reaction of acetone cyanhydrin, oleum, and alcohols, by the reaction of the product of acetone cyanhydrin and oleum with alcohols, or by the esterification of the dehydration products of the α hydroxysicbutyrates, the recovery of the esters in a state of high purity and in the monomeric form, offers considerable difficulty because the crude reaction mixture cannot be treated by simple distillation to recover in good yield the monomeric ester free from reactants and by-products. Polymerization difficulties are likewise encountered during the reaction and recovery steps, which also complicate these steps of the process.

An object of the present invention is to provide a continuous process for the preparation of unsaturated compounds. Another object is to provide for the preparation of esters of acrylic and alpha methacrylic acids by a continuous process wherein esters in a state of high purity are obtained free from polymeric forms of the esters. Yet another object is to provide a process for the preparation of esters of methacrylic acid wherein the reaction vapors from acetone cyanhydrin, oleum, and an alcohol are rectified for the separatiton of substantially all of the alcohol present by azeotropic distillation with a portion of the ester formed. Other objects and advantages of the invention will hereinafter appear.

The process, which is applicable to the preparation of unsaturated esters generally, will be illustrated by the preparation of methyl methacrylate from acetone cyanhydrin, oleum, and methanol. This process is conducted by reacting acetone cyanhydrin with oleum and passing the resulting product together with methanol water into a suitable reaction zone in the presence of a polymerization inhibitor. The esterification is conducted and the products distilled include methacrylic acid ester, alcohol and water, the ester being present in amounts above that necessary to form a binary with the methanol. These products are discharged from the reaction zone into a rectifying system maintained under such pressure and temperature conditions that from the top of the rectifier methanol and methyl methacrylate dstill over as an azeotrope often containing some methyl methacrylate over and above that necessary to give the azeotropic composition. The azeotrope is returned to the reaction zone and the heavier vapors from the rectifier, which contains primarily water and the excess of methyl methacrylate over and above that required to form an azeotrope with the methanol present, pass into a calandria or other similar vessel from which the methyl methacrylate is finally recovered. Liquid is withdrawn from the reaction zone, and is subjected to distillation to remove the more volatile constituents, and the resulting vapors, in the liquid or vapor phase, are returned to the reaction zone. Throughout this process a polymerization inhibitor is present, it being introduced into the reaction zone, rectifying columns, condensers, and other parts of the apparatus in which polymerization products tend to form.

The attached drawing illustrates by way of a flow sheet the process of the invention, the use of which is illustrated by the preparation of methyl methacrylate from acetone cyanhydrin and oleum.

Acetone cyanhydrin (400 parts, 92% pure) is added to oleum (610 parts, 100.5% $H_2SO_4$) in the reaction kettle 1. The addition is started at room temperature and the temperature gradually increases as the addition proceeds until the last portion of the cyanhydrin is added at about 100° C. After the addition has been completed, the mixture is heated to 115° C. and held at this temperature for at least an hour. The resultant mixture which may be designated as a methacrylamide-oleum mixture is then transferred to the mix feed tank 2 and batches of the mixture are prepared and transferred to the mix feed tank 2 at a frequency such that there is a supply of methacrylamide-oleum mixture always available. If desired, the methacrylamide-oleum mixture may be made by a continuous process wherein oleum and acetone cyanhydrin are continuously fed into a suitable reaction vessel, such as a long tube provided with adequate heating and cooling means, and the mixture continuously fed in this instance directly to the reactor 4 without intermediate storage. Simultaneously with the addition of the methacrylamide-oleum mixture, methanol is added from tank 3 to reactor 4.

Because of the presence of unsaturates formed during the reaction and during the recovery of the products, it is necessary to inhibit their polymerization and accordingly a charge of inhibitor such, for example, as a 2% hydroquinone solution in water is supplied by tank 14. This solution is continuously withdrawn from tank 14 and fed to the reactor 4, fractionating column 6, and condensers 8 and 13.

During the normal operation of this continuous system, the methacrylamide-oleum mixture is continuously added to the reactor 4, from the mix feed tank 2, at a rate of about 180 parts per hour, water being added from tank 5 to the reactor 4, at the same time at a rate in the order of 30 parts per hour and methanol is added from tank 3 so that approximately 30 parts are added per hour to reactor 4.

The liquid in reactor 4 is maintained at the boiling point, i. e. in the proximity of from 95 to 100° C. by the addition of steam to the jacket 4a of the reactor. Maintenance of this temperature will give approximately the desired rate of vapor feed to the fractionating column 6.

The vapors leaving the reactor 4 consist essentially of water, methanol, and methyl methacrylate. These vapors are separated in the fractionating column 6 in such a manner that the compositoin at the top of the column corresponds to that of the methanol-methyl methacrylate binary (85% by weight of methanol—15% by weight of methyl methacrylate, B. P. 64° C.). Operation of the column 6 is such that all of the methanol entering from the reactor and from any other source, leaves the top as the binary and the mixture of all the water and the excess ester over and above the amount required for the formation of the binary descends the column and is withdrawn at the base as a heterogeneous mixture. The column temperatures under advantageous conditions are maintained below 90° C. and preferably between approximately 80 and 82° C. at the base and below 70° C. and preferably between 64 and 66° C. at the head. The necessary heat for reflux is supplied by the calandria 7. The binary from column 6 is condensed in the condenser 8, a portion returned to column 6 as reflux, and the remainder returned to the reactor 4. The heterogeneous mixture of monomer and water (plus hydroquinone) withdrawn from the base of the fractionating column 6 is cooled in the cooler 9 and transferred to the decanter 11, where the water layer is separated from the monomer layer and either discharged to waste or returned to the reactor 4. The inhibited monomer is transferred to storage and is produced by this series of steps at a rate between 60 and 75 parts per hour containing 94 to 96% methyl methacrylate.

The level in the reactor is maintained by means of an overflow. The overflow liquid leaving reactor 4 containing methanol, methyl methacrylate, and methacrylic acid, run into the after-boiler 12 where it is given a steam distillation for the recovery of these materials. Live steam is admitted to the after boiler in an amount sufficient to give a boil-off rate approximately ten times that of the ester recovered. Jacket heat is applied through jacket 12a in an amount sufficient, assisted by the injected steam, to maintain the temperature in the after-boiler 12 at between approximately 110 and 115 C. The vapors leaving the after-boiler 12 are passed to condenser 13, condensed and returned to the reactor 4 where the recovered reactants are again subjected to esterification. The level in the after-boiler 12 is likewise maintained by an overflow, (not shown) the overflow liquid, being waste material, is discarded.

The process described for the preparation of methyl methacrylate may likewise be employed for the preparation of an ester of acrylic acid from an alcohol and ethylene cyanhydrin, or from a $\beta$ halogenpropionic acid ester as well as for the preparation of esters of $\alpha$ methacrylic acid from an alcohol and an $\alpha$ halogen isobutyric acid or from an alcohol and an $\alpha$ hydroxy isobutyric acid. Accordingly, the acrylic and $\alpha$ methacrylic acid esters of the following alcohols can be prepared: methanol, ethanol, normal and isopropanol, normal and isobutanol, and the straight and branch chained aliphatic alcohols such as nonyl, decyl, and lauryl alcohols; the primary, secondary, and tertiary straight or branch chained saturated or unsaturated alcohols, the esters of alpha methacrylic acid generally and more especially those disclosed in U. S. Patents:

| | |
|---|---|
| 2,020,685 | 2,129,666 |
| 2,026,894 | 2,129,667 |
| 2,041,820 | 2,129,668 |
| 2,109,877 | 2,129,685 |
| 2,111,509 | 2,129,690 |
| 2,129,662 | 2,129,694 |
| 2,129,663 | 2,138,031 |
| 2,129,664 | 2,128,762 |
| 2,129,665 | 2,140,469 |

Inhibitors other than hydroquinone may be employed for suppressing the polymerization of the unsaturated compounds during the process, examples of which are: tannic acid, copper, sulfur, antimony chloride, arsenic trichloride, aluminum chloride, bismuth chloride, and other suitable polymerization inhibitors.

The ester obtained directly by the process of the invention is substantially free from alcohol due primarily to the fractionating step wherein the alcohol is carried over as a binary with a portion of the ester produced. The process accordingly is applicable to a similar method of recovering esters of methacrylic acid from reaction mixtures containing it and the unreacted alcohol, providing the temperature of the fractionating column is so controlled that an azeotrope passes off as vapor carrying with it all of the alcohol present. Thus, for example, when preparing ethyl methacrylate and distilling under a vacuum of about 200 mm., the temperature at the head of the fractionating column is maintained at approximately 46° C., the boiling point at this pressure of this binary, which contains 87.8% ethanol and 12.2% ethyl methacrylate and has a sp. gr. at 15° C. of 0.808. Other methacrylic acid ester-alcohol binaries have these characteristics:

| Binary | Ester, wt. per cent | Boiling point, ° C. | Sp. grav. 15° C. |
|---|---|---|---|
| n-Propanol n-Propyl methacrylate | 7.5 | 51° C. at 100 mm | 0.813 |
| n-Butanol n-Butyl methacrylate | 5.1 | 65° C. at 80 mm | 0.816 |
| Iso-butanol Iso-butyl methacrylate | 3.5 | 57° C. at 80 mm | 0.808 |

In some instances its is advisable to add an alcohol withdrawing agent such, for example, as carbon tetrachloride, benzene, and toluene when higher alcohols are to be removed.

Another feature of the invention is the ease with which the esters of the unsaturated acids are recovered. Subsequent to their distillation as formed in the reaction vessel the resulting vapors are condensed with water in the rectifying column and this condensate is then cooled and finally passed into the decanter wherein the ester is continuously separated from the water, both flowing through conventionally disposed concentrically mounted pipes of different diameters and heights from the decanter 11, the water to the sewer and the ester to storage.

I claim:

1. A process for the continuous preparation of an ester of alpha methacrylic acid which comprises continuously feeding an alcohol, water and the reaction product of acetone cyanhydrin and oleum into a reaction zone maintained at reaction temperature, whereby a reaction product is formed which on distillation gives a distillate containing a methacrylic acid ester in excess of that necessary to form a binary with the alcohol present in the distillate distilling an ester of alpha methacrylic acid and water from the reaction mixture as formed together with the alcohol separating from the resulting vapors during rectification substantially all of the alcohol by azeotropic distillation with a portion of the ester, leaving the ester of alpha methacrylic acid and water, condensing the azeotrope and returning it to the reaction zone the alcohol forming with the ester a binary having a boiling point below that of the binary formed between the ester and water.

2. A process for the continuous preparation of methyl methacrylate which comprises continuously feeding methanol water and the reaction product of acetone cyanhydrin and oleum into a reaction zone maintained at reaction temperature, whereby a reaction product is obtained which upon distillation gives a distillate containing methyl methacrylate in excess of that necessary to form an azeotrope with the methanol present in the distillate distilling methyl methacrylate and water from the reaction mixture as formed together with methanol, separating from the resulting vapors substantially all the methanol as a binary with methyl methacrylate leaving methanol-free methyl methacrylate and water, and returning the binary composition to the reaction zone.

3. A process for the preparation of methyl methacrylate which comprises continuously feeding methanol water and the reaction product of acetone cyanhydrin and oleum into a reaction zone maintained at a temperature between 95 and 100° C., whereby a reaction product is obtained which upon distillation gives a distillate containing methyl methacrylate in excess of that necessary to form an azeotrope with the methanol present in the distillate subjecting the reaction vapors to rectification at a temperature between 64 and 82° C., taking off overhead a methanol-methyl methacrylate binary and taking away underneath a mixture of water and methyl methacrylate free of methanol returning a methanol-methyl methacrylate binary from rectification to the reaction zone while continuously withdrawing from the reaction zone a portion of the liquid, distilling therefrom methanol and methyl methacrylate and returning them to the reaction zone.

4. A process for the preparation of methyl methacrylate which comprises continuously feeding methanol water and a reaction product prepared by by the interaction of approximately 140 parts of acetone cyanhydrin with approximately 610 parts of oleum into a reaction zone, at a rate of 180 parts per hour together with water and methanol each at a rate of about 30 parts per hour, subjecting the reaction mixture to distillation and the vapors therefrom to rectification while maintaining a maximum temperature during rectification between 80 and 82° C., taking off overhead a methanol-methyl methacrylate binary and taking away underneath a mixture of water and methyl methacrylate free of methanol returning to the reaction zone the methanol-methyl methacrylate binary composition, while continuously withdrawing from the reaction zone a portion of the liquid present, subjecting said liquid to distillation, condensing the vapors therefrom and returning the condensate to the reaction zone.

5. In a process for the continuous preparation of an ester of methacrylic acid the steps which comprise continuously feeding an alcohol, water and the reaction product of acetone cyanhydrin and oleum into a reaction zone maintained at reaction temperature, whereby a reaction product is formed which on distillation gives a distillate containing a methacrylic acid ester in excess of that necessary to form a binary with the alcohol present in the distillate continuously distilling methacrylic acid ester, water, and alcohol vapors from the reaction mixture, distill overhead from the reaction vapors substantially all of the alcohol as a binary with a portion of the ester and condensing from the reaction vapors all of the water and the remaining ester and subsequently separating by decantation the ester from the water the alcohol forming with the ester a binary having a boiling point below that of the binary formed between the ester and water.

6. In a process for the continuous preparation of methyl methacrylate the steps which comprise continuously feeding methanol water and the reaction product of acetone cyanhydrin and oleum into a reaction zone maintained at reaction temperature, whereby a reaction product is formed which on distillation gives a distillate containing a methacrylic acid ester in excess of that necessary to form a binary with the alcohol present in the distillate continuously distilling methyl methacrylate, water and alcohol vapors from the reaction mixture, distill overhead from the reaction vapors substantially all of the methanol as a binary with a portion of the methyl methacrylate, condensing from the reaction vapors all of the water and the remaining methyl methacrylate, and subsequently condensing and separating by decantation the methyl methacrylate from the water.

7. A continuous process for the preparation of an alkyl ester of alpha methacrylic acid from acetone cyanhydrin, an alcohol, water and oleum, the steps which comprise continuously distilling off the unsaturated ester of alpha methacrylic acid as formed together with some alcohol and water, the vapors containing an excess of the ester over and above that necessary to form an azeotrope with the alcohol, separating the constituents of this vapor by rectification distilling substantially all of the alcohol and a portion of the ester overhead, removing the residual portion of the ester together with water and subsequently recovering from the ester-water mixture the ester by decantation the alcohol forming with the ester a binary having a boiling point below that of the binary formed between the ester and water.

8. In a continuous process for the preparation of methyl methacrylate from acetone cyanhydrin, water methanol and oleum, the steps which comprise continuously distilling over the methyl methacrylate as formed together with a portion of the methanol and water, the vapors containing methyl methacrylate in excess of that necessary to form an azeotrope with the methanol, subjecting the resulting mixture of vapors to rectification and distilling overhead an azeotrope containing substantially all of the methanol and a portion of the methyl methacrylate and taking off underneath as a liquid the remaining methyl methacrylate and water and subsequently separating the methyl methacrylate from the water by decantation.

LAWRENCE T. JILK.

REFERENCES CITED

The following references are of record in the file of this patent:

UNITED STATES PATENTS

| Number | Name | Date |
|---|---|---|
| 1,998,413 | Reppe | Apr. 16, 1935 |
| 2,042,458 | Crawford | June 2, 1936 |
| 2,265,785 | Wainwright | Dec. 9, 1941 |
| 1,726,945 | Buc et al. | Sept. 3, 1929 |

OTHER REFERENCES

Wuyts, Bulltein de la Societe Chimigue de Belgique, Tome 33, No. 3, March 1938, pages 167 to 192.